United States Patent
Sugano

(10) Patent No.: US 11,738,754 B2
(45) Date of Patent: Aug. 29, 2023

(54) TRAVEL ROUTE GENERATION SYSTEM AND VEHICLE DRIVING ASSISTANCE SYSTEM

(71) Applicant: Mazda Motor Corporation, Hiroshima (JP)

(72) Inventor: Takashi Sugano, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 317 days.

(21) Appl. No.: 17/161,691

(22) Filed: Jan. 29, 2021

(65) Prior Publication Data

US 2021/0253106 A1   Aug. 19, 2021

(30) Foreign Application Priority Data

Feb. 13, 2020   (JP) .................................. 2020-022370

(51) Int. Cl.
  *B60W 30/095*   (2012.01)
  *B60W 30/16*   (2020.01)
  (Continued)

(52) U.S. Cl.
  CPC .. *B60W 30/18163* (2013.01); *B60W 30/0956* (2013.01); *B60W 2554/4042* (2020.02); *B60W 2554/801* (2020.02); *B60W 2554/804* (2020.02)

(58) Field of Classification Search
  CPC ....... B60W 30/18163; B60W 30/0956; B60W 2554/4042; B60W 2554/801;
  (Continued)

(56) References Cited

U.S. PATENT DOCUMENTS

2009/0088925 A1*  4/2009  Sugawara ............. B60W 30/12
                                                340/436
2017/0102705 A1   4/2017  Silvlin et al.
(Continued)

FOREIGN PATENT DOCUMENTS

JP          2017-100657 A    6/2017

OTHER PUBLICATIONS

Extended European search report dated Jun. 25, 2021, in corresponding European patent Application No. 21153902.8, 7 pages.

*Primary Examiner* — Abby Y Lin
*Assistant Examiner* — Hossam M Abd El Latif
(74) *Attorney, Agent, or Firm* — Xsensus LLP

(57) ABSTRACT

A vehicle driving assistance system includes a travel route generation system that acquires travel road information and obstacle information acquired by sensor(s), and generates the target travel route, on which a host vehicle travels, on a travel road. When the host vehicle changes lanes, the system acquires information on three peripheral vehicles, which exist near the host vehicle, on a change destination lane from the obstacle information, sets a target space, to which the host vehicle 1 should move, between two each of the three peripheral vehicles on the change destination lane based on this information on the three peripheral vehicles, predicts a change in size of each of the target spaces, and generates the target travel route, on which the host vehicle travels during the lane change, on the basis of this predicted change in the size of each of the target spaces.

18 Claims, 7 Drawing Sheets

(51) Int. Cl.
    *B60W 30/18*    (2012.01)
    *B60W 60/00*    (2020.01)
    *G06V 20/58*    (2022.01)
    *G08G 1/16*    (2006.01)

(58) Field of Classification Search
    CPC ..... B60W 2554/804; B60W 60/00272; B60W 60/00276; B60W 2420/52; B60W 2520/10; B60W 2520/14; B60W 2540/10; B60W 30/16; B60W 2420/42; B60W 2520/105; B60W 2540/18; B60W 2554/4049; B60W 2556/50; G08G 1/167; G06V 20/58
    USPC .......................................................... 701/23
    See application file for complete search history.

(56)    References Cited

U.S. PATENT DOCUMENTS

| | | | |
|---|---|---|---|
| 2019/0185005 A1* | 6/2019 | Fukuda | B60W 30/09 |
| 2019/0329777 A1* | 10/2019 | Rajab | B60W 50/0097 |
| 2020/0001867 A1* | 1/2020 | Mizutani | B60W 30/0956 |
| 2020/0010095 A1* | 1/2020 | Kim | B60W 10/20 |
| 2021/0009115 A1 | 1/2021 | Ohmura et al. | |

\* cited by examiner

TRAVEL ROUTE GENERATION SYSTEM AND VEHICLE DRIVING ASSISTANCE SYSTEM

CROSS REFERENCE TO RELATED APPLICATION

The present application claims priority to Japanese patent application JP 2020-022370, filed Feb. 13, 2020, the entire contents of which being incorporated herein by reference in its entirety.

TECHNICAL FIELD

The present disclosure relates to a travel route generation system that generates a travel route of a vehicle and a vehicle driving assistance system that assists with driving of the vehicle on the basis of the travel route.

BACKGROUND ART

Conventionally, a technique of setting a target travel route on which a host vehicle travels on the basis of a surrounding situation of the host vehicle and a state of the host vehicle and assisting with driving of the vehicle on the basis of this target travel route (more specifically, driving assist control and automated driving control) has been developed. For example, in Patent document 1, a technique of setting a start point and an end point of a lane change on the basis of information on the host vehicle, information on another vehicle around the host vehicle, and the like and generating the target travel route according to these points at the time of the lane change is disclosed.

PRIOR ART DOCUMENTS

Patent Documents

[Patent document 1] JP-A-2017-100657

SUMMARY

Problems to be Solved

The inventor of the present application has considered that the target travel route, on which the host vehicle can move safely between peripheral vehicles existing on a change destination lane (typically, between a preceding vehicle and a following vehicle existing near the host vehicle) when the host vehicle changes a lane, is desirably generated. In this case, in order to appropriately secure the safety during the lane change, it is desired to accurately recognize a space between the peripheral vehicles, to which the host vehicle moves, on the change destination lane. More specifically, it is desired to accurately recognize a position and size of the space between the peripheral vehicles that are changed according to the peripheral vehicles, each of which moves at various speeds from time to time.

In Patent document 1 described above, the description is only made that the target travel route is generated during the lane change, and the problem on which the inventor of the present application has focused is not disclosed at all. Naturally, a technique capable of solving this problem is neither disclosed nor suggested.

The present disclosure has been made to solve the above-described, and other, problems and therefore has a purpose of providing a travel route generation system and a vehicle driving assistance system, the travel route generation system capable of appropriately generating a target travel route through which a host vehicle can move safely to a position between peripheral vehicles on a change destination lane when the host vehicle changes the lane, and the vehicle driving assistance system capable of assisting with driving of the vehicle on the basis of this target travel route.

Means for Solving the Problem

In order to achieve the above purpose, the present disclosure provides a travel route generation system having: a travel road information acquisition sensor that acquires travel road information on a travel road of a host vehicle; an obstacle information acquisition sensor that acquires obstacle information on an obstacle on the travel road; and an arithmetic device (such as circuitry) configured to generate a target travel route, on which the host vehicle travels, in the travel road based on the travel road information and the obstacle information. The arithmetic device is configured to: acquire information on at least two peripheral vehicles, which exist near the host vehicle on a change destination lane, from the obstacle information under a condition it is planned for the host vehicle to change lanes; set a target space, to which the host vehicle should move, between the at least two peripheral vehicles in the change destination lane based on the information on the at least two peripheral vehicles; and predict a change in size of the target space; and generate the target travel route, on which the host vehicle travels during a lane change operation, based on the predicted change in the size of the target space.

According to the present disclosure that is configured as described above, in the case where the host vehicle changes the lane, the arithmetic device sets the target space, to which the host vehicle should move, between the peripheral vehicles in the change destination lane, predicts the change in the size of the target space (corresponding to a length of the target space along a stretching direction of the travel road), and generates the target travel route, on which the host vehicle travels during the lane change. In this way, it is possible to accurately recognize the size of the space between the peripheral vehicles that is changed according to the peripheral vehicles, each of which moves at various speeds from time to time. Therefore, according to the present disclosure, when the host vehicle changes the lane on the basis of the target travel route, the host vehicle can safely move to the position between the peripheral vehicles on the change destination lane.

In the present disclosure, the arithmetic device is configured to: acquire information on a first peripheral vehicle that exists on the change destination lane, information on the second peripheral vehicle that exists behind the first peripheral vehicle, and information on a third peripheral vehicle that exists behind the second peripheral vehicle as the information on the at least two peripheral vehicles; set a first target space between the first peripheral vehicle and the second peripheral vehicle and a second target space between the second peripheral vehicle and the third peripheral vehicle as the target spaces on the basis of the information on the first, second, and third peripheral vehicles; select one of the first and second target spaces on the basis of the change in the size of each of the first and second target spaces; and generate the target travel route on the basis of the selected target space.

According to the present disclosure that is configured as described above, the arithmetic device sets the two target spaces (the first and second target spaces) on the change destination lane, selects one of the target spaces on the basis of the change in the size of each of these two target spaces, and generates the target travel route on the basis of the selected target space. In this way, of the spaces between the two peripheral vehicles existing near the host vehicle on the change destination lane, the space that is adequate for movement of the host vehicle is accurately adopted, and the target travel route can thereby be generated.

In the present disclosure, preferably, the arithmetic device is configured to select the target space that is increased in the case where one of the first and second target spaces is increased while the other is not increased.

This is because it is considered that the host vehicle can move more safely to the increased target space than to the reduced target space. According to the present disclosure that is configured as described above, it is possible to accurately adopt the target space, to which the host vehicle can move further safely for the lane change.

In the present disclosure, preferably, the arithmetic device is configured to select the target space with a lower change rate of the size in the case where both of the first and second target spaces are not increased.

This is because it is considered that the host vehicle can move safely to the target space with a smaller change rate in size in the case where both of the first and second target spaces are reduced or are in constant size. Also, according to the present disclosure that is configured as described above, it is possible to accurately adopt the target space, to which the host vehicle can move further safely for the lane change.

In the present disclosure, preferably, the arithmetic device is configured to select the larger target space of the first and second target spaces in the case where both of the first and second target spaces are reduced and the size of one or both of the first and second target spaces is equal to or larger than a specified value.

This is because it is considered that that the host vehicle moves safely to this target space when the target space is reduced but is still large enough. Also, according to the present disclosure that is configured as described above, it is possible to accurately adopt the target space, to which the host vehicle can move further safely for the lane change.

In the present disclosure, preferably, the arithmetic device selects the second target space in the case where the change in the size of the first and second target spaces is substantially the same.

This is because it is considered to be safer when the host vehicle 1 is decelerated during the lane change and moves to the second target space at the rear than when the host vehicle 1 is accelerated during the lane change and moves to the first target space in front in the case where change states of the first and second target spaces are the same. Also, according to the present disclosure that is configured as described above, it is possible to accurately adopt the target space, to which the host vehicle can move further safely for the lane change.

In the present disclosure, preferably, the arithmetic device is configured to: set a dangerous area that the host vehicle does not enter around each of the at least two peripheral vehicles on the basis of the information on the at least two peripheral vehicles; set the target space between the dangerous areas that are set around the at least two peripheral vehicles; and set a portion stretched behind the peripheral vehicle in the dangerous area to be longer than a portion stretched ahead of the peripheral vehicle therein.

According to the present disclosure that is configured as described above, the target space is set on the basis of the dangerous area that is set around each of the peripheral vehicles. Thus, when the host vehicle changes the lane and moves to the target space on the basis of the target travel route, it is possible to effectively prevent a collision of the host vehicle with the peripheral vehicle. In addition, according to the present disclosure, the portion behind the peripheral vehicle in the dangerous area is set to be longer than the portion ahead of the peripheral vehicle therein. Thus, it is possible to effectively prevent the collision of the host vehicle with the peripheral vehicle in the case where the peripheral vehicle (particularly, a preceding vehicle) is decelerated during the lane change of the host vehicle.

In the present disclosure, preferably, the arithmetic device is configured to generate such a target travel route that the host vehicle starts changing the lane when a relative speed between a speed of the host vehicle and a moving speed of the target space becomes lower than a specified speed.

According to the present disclosure that is configured as described above, when the host vehicle changes the lane on the basis of the target travel route, the host vehicle can safely and reliably move to the target space.

In the present disclosure, preferably, the arithmetic device is configured to: generate the target travel route, on which the host vehicle travels during the lane change, on the basis of the predicted change in the size of the target space in the case where a distance to a point, at which the host vehicle should change the lane, is shorter than a specified distance; and predict a future position of the target space on the basis of the moving speed of the target space and generate the target travel route, on which the host vehicle travels during the lane change, on the basis of the predicted future position in the case where the distance to the point, at which the host vehicle should change the lane, is equal to or longer than the specified distance.

According to the present disclosure that is configured as described above, it is possible to appropriately switch processing to generate the target travel route on the basis of the target space according to whether the point, at which the host vehicle should change the lane, is located far away from or near the host vehicle.

In another aspect, in the present disclosure, a vehicle driving assistance system has a controller that is configured to execute driving control of a vehicle such that the vehicle travels along a travel route generated by the above-described travel route generation system.

Advantages

The travel route generation system according to the present disclosure can appropriately generate the target travel route through which the host vehicle can safely move to the position between the peripheral vehicles on the change destination lane when the host vehicle changes the lane. The vehicle driving assistance system according to the present disclosure can appropriately assist with driving of the vehicle on the basis of such a target travel route.

MODES FOR CARRYING OUT THE DISCLOSURE

A description will hereinafter be made on a travel route generation system and a vehicle driving assistance system according to an embodiment of the present disclosure with reference to the accompanying drawings.

[System Configuration]

Figure 1:
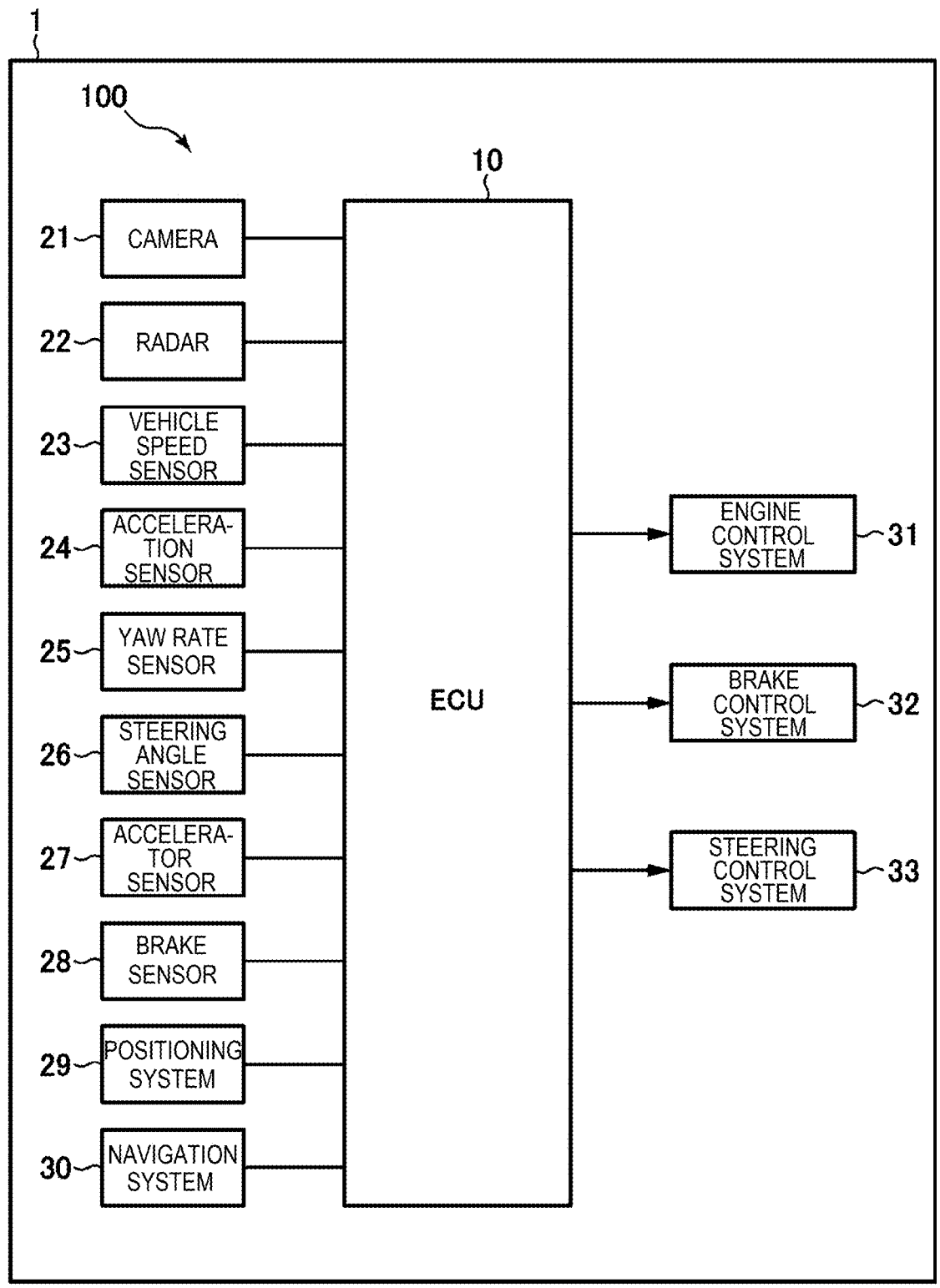
FIG. 1 is a block diagram illustrating a schematic configuration of a vehicle driving assistance system to which a travel route generation system according to an embodiment of the present disclosure is applied.

A description will firstly be made on a configuration of the vehicle driving assistance system, to which the travel route generation system according to the embodiment of the present disclosure is applied, with reference to FIG. 1. FIG. 1 is a block diagram illustrating a schematic configuration of the vehicle driving assistance system to which the travel route generation system according to the embodiment of the present disclosure is applied.

A vehicle driving assistance system 100 has a function as the travel route generation system that sets a target travel route, on which a vehicle (hereinafter appropriately referred to as a "host vehicle") 1 travels, on a travel road, and is configured to execute driving assistance control (driving assist control and automated driving control) to cause the vehicle 1 to travel along this target travel route. As illustrated in FIG. 1, the vehicle driving assistance system 100 has an electronic control unit (ECU) 10 as an arithmetic device and a controller, plural types of sensors, and plural control systems.

More specifically, the plural types of the sensors are a camera 21, a radar 22, a vehicle speed sensor 23 for detecting behavior of the vehicle 1 and a driving operation by an occupant, an acceleration sensor 24, a yaw rate sensor 25, a steering angle sensor 26, an accelerator sensor 27, and a brake sensor 28. The plural types of the sensors further include a positioning system 29 for detecting a position of the vehicle 1 and a navigation system 30. The plural control systems are an engine control system 31, a brake control system 32, and a steering control system 33.

Moreover, other types of the sensors may be a peripheral sonar system for measuring a distance and a position of a peripheral structure with respect to the vehicle 1, a corner radar provided at each of four corners of the vehicle 1 to measure an approach of the peripheral structure, and an inner camera for capturing an image of the inside of a cabin of the vehicle 1.

The ECU 10 performs various calculations on the basis of signals received from the plural types of the sensors, and sends control signals to the engine control system 3l, the brake control system 32, and the steering control system 33 so as to appropriately actuate an engine system, a brake system, and a steering system, respectively. The ECU 10 is constructed of a computer that includes one or more processors (typically CPUs), memory (ROM, RAM, or the like) for storing various programs, an input/output device, and the like. The ECU 10 corresponds to an example of the "arithmetic device" and an example of the "controller" in the present disclosure, and may be implemented as a computer, and/or computer circuitry, and/or logic device(s), such as application specific integrated circuits, configured by software (held in memory) and/or firmware settings to perform the specified operations described herein.

The camera 21 captures an image around the vehicle 1, and outputs image data. Based on the image data received from the camera 21, the ECU 10 identifies objects (for example, a preceding vehicle (a forward vehicle), a following vehicle (a rear vehicle), a parked vehicle, a pedestrian, a travel road, road marking lines (a lane divider, a white line, and a yellow line), a traffic signal, a traffic sign, a stop line, an intersection, an obstacle, and the like). The ECU 10 may acquire information on the object from the outside through a traffic infrastructure, inter-vehicle communication, or the like. In this way, a type, a relative position, a moving direction, and the like of the object are identified.

The radar 22 measures a position and a speed of the object (particularly, the preceding vehicle, the following vehicle, the parked vehicle, the pedestrian, a dropped object on the travel road, or the like). For example, a millimeter-wave radar can be used as the radar 22. The radar 22 transmits a radio wave in an advancing direction of the vehicle 1, and receives a reflected wave that is generated when the object reflects the transmitted wave. Then, based on the transmitted wave and the received wave, the radar 22 measures a distance between the vehicle 1 and the object (for example, an inter-vehicular distance) and a relative speed of the object to the vehicle 1. In this embodiment, instead of the radar 22, a laser radar, an ultrasonic sensor, or the like may be used to measure the distance from the object and the relative speed of the object. Alternatively, the plural types of the sensors may be used to constitute a position and speed measuring device.

The camera 21 and the radar 22 correspond to an example of the "travel road information acquisition device" and an example of the "obstacle information acquisition device" in the present disclosure. For example, "travel road information" includes information on a shape of the travel road (a straight road, a curved road, or a curvature of the curved road), a travel road width, the number of lanes, a lane width, regulation information of the travel road designated on the traffic sign or the like (a speed limit or the like), the intersection, a crosswalk, and the like. "Obstacle information" includes information on presence or absence of the obstacle on the travel road of the vehicle 1 (for example, the object, such as the preceding vehicle, the following vehicle, the parked vehicle, or the pedestrian, that can possibly be the obstacle in travel of the vehicle 1), a moving direction of the obstacle, and a moving speed of the obstacle, and the like.

The vehicle speed sensor 23 detects an absolute speed of the vehicle 1. The acceleration sensor 24 detects acceleration of the vehicle 1. This acceleration includes acceleration in a longitudinal direction and acceleration in a lateral direction (that is, lateral acceleration). The acceleration includes not only a change rate of the speed in a speed increasing direction but also a change rate of the speed in a speed reducing direction (that is, deceleration).

The yaw rate sensor 25 detects a yaw rate of the vehicle 1. The steering angle sensor 26 detects a rotation angle (a steering angle) of a steering wheel of the vehicle 1. The ECU 10 executes a specified calculation on the basis of the absolute speed detected by the vehicle speed sensor 23 and the steering angle detected by the steering angle sensor 26, and can thereby acquire a yaw angle of the vehicle 1. The accelerator sensor 27 detects a depression amount of an accelerator pedal. The brake sensor 28 detects a depression amount of a brake pedal.

The positioning system 29 is a GPS system and/or a gyroscopic system, and detects the position of the vehicle 1 (current vehicle position information). The navigation system 30 stores map information therein, and can provide the map information to the ECU 10. Based on the map information and the current vehicle position information, the ECU 10 identifies a road, the intersection, the traffic signal, a building, and the like existing around (particularly, in the advancing direction of) the vehicle 1. The map information may be stored in the ECU 10. The navigation system 30 also corresponds to an example of the "travel road information acquisition device" in the present disclosure.

The engine control system 31 controls an engine of the vehicle 1. The engine control system 31 is a component capable of regulating engine output (drive power) and, for example, includes an ignition plug, a fuel injection valve, a throttle valve, a variable valve mechanism that changes opening/closing timing of intake/exhaust valves, and the like. When the vehicle 1 has to be accelerated or decelerated, the ECU 10 sends the control signal to the engine control system 31 so as to change the engine output.

The brake control system 32 controls the brake system of the vehicle 1. The brake control system 32 is a component capable of regulating a braking force of the brake system and, for example, includes a hydraulic pump, a valve unit, and the like. When the vehicle 1 has to be decelerated, the ECU 10 sends the control signal to the brake control system 32 so as to generate the braking force.

The steering control system 33 controls a steering device of the vehicle 1. The steering control system 33 is a component capable of regulating the steering angle of the vehicle 1 and, for example, includes an electric motor for an electric power steering system, and the like. When the advancing direction of the vehicle 1 has to be changed, the ECU 10 sends the control signal to the steering control system 33 so as to change a steering direction. Each of the control systems 31, 32, and/or 33 may be implemented with processing circuitry (e.g., one or more programmable devices, such as a micro controller, and/or dedicated circuitry such as one or more ASICs, or combinations thereof to execute the operations described herein.

[Generation of Target Travel Route]

Next, a description will be made on generation of the target travel route by the above-described ECU 10 in the embodiment of the present disclosure. First, a description will be made on a brief summary thereof with reference to FIG. 2 and FIG. 3.

Figure 2:
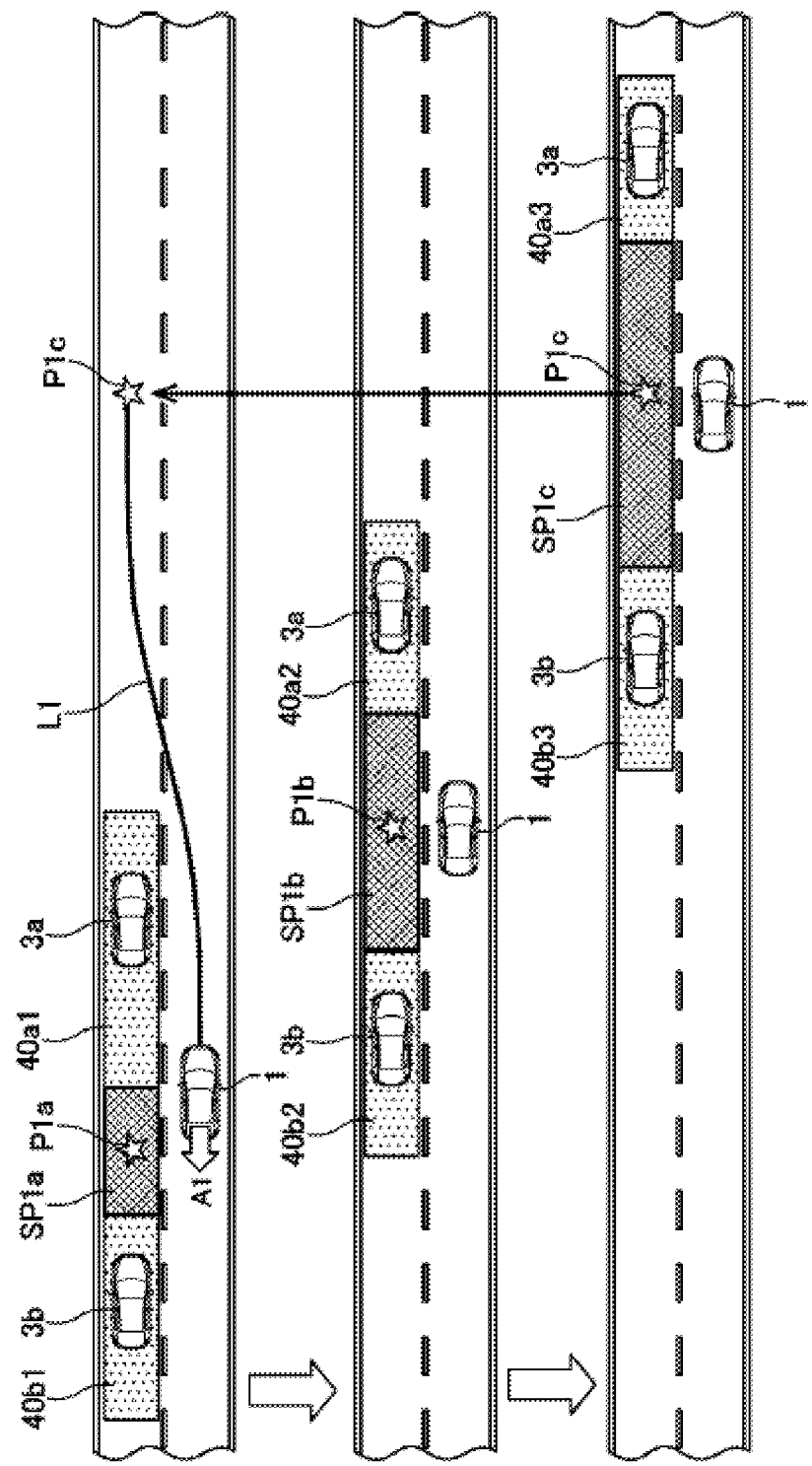
FIG. 2 is an explanatory view of a method for generating a target travel route on which a host vehicle travels during a lane change in the case where a point at which the host vehicle should change the lane is located relatively far away in the embodiment of the present disclosure.

FIG. 2 is an explanatory view of a method for generating the target travel route on which the host vehicle 1 travels during a lane change in the case where a point at which the host vehicle 1 should change the lane is located relatively far away (in the case where a distance between the host vehicle 1 and the point at which the vehicle 1 should change the lane is equal to or longer than a specified distance (1 km in one example), for example, in the case where a merging point or a branched point at which the lane change is necessary is located relatively far away. In FIG. 2, a current situation around the host vehicle 1 is illustrated in an upper section, a situation around the host vehicle 1 that is predicted after a lapse of a first time (for example, three seconds) from current time is illustrated in a middle section, and a situation around the host vehicle 1 that is predicted after a lapse of a second time (a longer time than the first time, for example, six seconds) from the current time is illustrated in a lower section. In this embodiment, in a period from the current time to the lapse of the second time, the ECU 10 repeatedly predicts the situation around the host vehicle 1 in specified cycles. This second time is usually set on the basis of a time required for the vehicle to change the lane.

First, in the case where the host vehicle 1 changes the lane, the ECU 10 acquires information on peripheral vehicles 3*a*, 3*b*, which exist near the host vehicle 1 on an adjacent lane as a change destination, from the above obstacle information. In this case, the ECU 10 basically acquires the information on the two peripheral vehicles 3*a*, 3*b* that are located the closest to the host vehicle 1 on the adjacent lane as the change destination. In detail, the ECU 10 acquires the information on the peripheral vehicle 3*a* and the information on the peripheral vehicle 3*b*. The peripheral vehicle 3*a* is the preceding vehicle, which is located the closest to the host vehicle 1, on the adjacent lane, and the information on the peripheral vehicle 3*b* is the following vehicle, which is located the closest to the host vehicle 1, on the adjacent lane. In this embodiment, in the case where the point at which the host vehicle 1 should change the lane is located relatively far away, there is a tendency that a distance between the peripheral vehicles on the adjacent lane is long (in other words, there is a tendency that the peripheral vehicles on the adjacent lane are relatively scarce). In addition, both of a sufficient time and the sufficient distance for the lane change are available. Thus, the ECU 10 only considers a single space between the peripheral vehicles, to which the host vehicle 1 moves for the lane change, when setting the target travel route for the lane change, that is, the ECU 10 only considers the two peripheral vehicles 3*a*, 3*b* that form the single space. That is, the ECU 10 focuses on recognition of the single space between the peripheral vehicles.

Next, the ECU 10 respectively sets dangerous areas 40*a*1, 40*b*1 around the peripheral vehicles 3*a*, 3*b* on the basis of the acquired information on the peripheral vehicles 3*a*, 3*b*. The dangerous areas 40*a*1, 40*b*1 are provided to prevent entry of the host vehicle 1 in the driving assistance based on the target travel route. More specifically, the ECU 10 sets the dangerous areas 40*a*1, 40*b*1 on the basis of a relative speed and a relative distance (an inter-vehicular distance) between the host vehicle 1 and each of the peripheral vehicles 3*a*, 3*b*, and the like. For example, the ECU 10 calculates time-headway (THW) and/or a time to collision (TTC) between the vehicle 1 and each of the peripheral vehicles 3*a*, 3*b* on the basis of these relative speed and relative distance, and sets the dangerous areas 40*a*1, 40*b*1 from the calculated THW and/or TTC. The THW is calculated by dividing the relative distance between the host vehicle 1 and each of the peripheral vehicles 3*a*, 3*b* by a speed of the host vehicle 1. The TTC is calculated by dividing the relative distance between the host vehicle 1 and each of the peripheral vehicles 3*a*, 3*b* by the relative speed between the host vehicle 1 and each of the peripheral vehicles 3*a*, 3*b*.

In addition, the ECU 10 sets portions stretched behind the peripheral vehicles 3*a*, 3*b* in the dangerous areas 40*a*1, 40*b*1 to be longer than portions stretched in front of the peripheral vehicles 3*a*, 3*b* in the dangerous areas 40*a*1, 40*b*1. A reason therefor is as follows. When a case where the host vehicle 1 cuts in front of one of the peripheral vehicles 3*a*, 3*b* is considered, in this case, a driver of corresponding one of the peripheral vehicles 3*a*, 3*b* is basically looking ahead. Thus, there is a low possibility that the driver of one of the peripheral vehicles 3*a*, 3*b* accelerates corresponding one of the peripheral vehicles 3a, 3b. Rather, this driver is likely to decelerate corresponding one of the peripheral vehicles 3a, 3b. As a result, it is considered that the peripheral vehicles 3a, 3b, which travel on the adjacent lane, are more likely to be decelerated than accelerated. For such a reason, it is considered that a collision of the host vehicle 1 with a rear portion of one of the peripheral vehicles 3a, 3b at the time when the host vehicle 1 changes the lane and corresponding one of the peripheral vehicles 3a, 3b is decelerated should preferentially be prevented over a collision of the host vehicle 1 with a front portion of one of the peripheral vehicles 3a, 3b at the time when the host vehicle 1 changes the lane and corresponding one of the peripheral vehicles 3a, 3b is accelerated. Thus, in this embodiment, the ECU 10 sets the portions behind the peripheral vehicles 3a, 3b in the dangerous areas 40a1, 40b1 to be longer than the portions in front of the peripheral vehicles 3a, 3b therein as described above. In this way, it is possible to effectively prevent the collision of the host vehicle 1 with one of the peripheral vehicles 3a, 3b in the case where corresponding one of the peripheral vehicles 3a, 3b is decelerated during the lane change of the host vehicle 1.

Next, between the thus-set dangerous area 40a1 and dangerous area 40b1, the ECU 10 sets a target space SP1a, to which the host vehicle 1 should move by the lane change, on the adjacent lane. A length of the target space SP1a along a stretching direction of the travel road corresponds to a distance between the dangerous area 40a1 and the dangerous area 40b1, and a length (a width) of the target space SP1a along a width direction of the travel road corresponds to a length (a width) of each of the dangerous areas 40a1, 40b1 along the width direction of the travel road. In addition, the ECU 10 sets a target point P1a in the target space SP1a, and the target point P1a serves as a travel mediating point that is used when the target travel route for the lane change is set. More specifically, the ECU 10 sets the target point P1a at a center of the target space SP1a.

Thereafter, in the period from the current time to the lapse of the second time, the ECU 10 repeatedly predicts the situation around the host vehicle 1 in the specified cycles. As illustrated in the middle section of FIG. 2, in the middle of the period from the current time to the lapse of the second time, more specifically, after the lapse of the first time from the current time, the ECU 10 predicts dangerous areas 40a2, 40b2 of the peripheral vehicles 3a, 3b. In this case, the ECU 10 predicts, the relative speed, the relative distance (the inter-vehicular distance), and the like between the host vehicle 1 and each of the peripheral vehicles 3a, 3b after the first time, and based on these relative speed, relative distance, and the like, sets the dangerous areas 40a2, 40b2 by a similar method to that described above.

Next, the ECU 10 sets a target space SP1b between the set dangerous area 40a2 and the set dangerous area 40b2, and also sets a target point P1b at a center of this target space SP1b. Then, the ECU 10 calculates the speed of the host vehicle 1, at which the host vehicle 1 follows the target point P1b, on the basis of a relative speed and a relative distance between the host vehicle 1 and the target point P1b. Based on the relative speed between the speed of this host vehicle 1 and the speed of the peripheral vehicle 3a as the preceding vehicle, and the like, the ECU 10 determines a possibility of a collision of the host vehicle 1 with the peripheral vehicle 3a at the time when the host vehicle 1 changes the lane. In the example illustrated in FIG. 2, the ECU 10 determines that there is no possibility of the collision, and keeps predicting the situation around the host vehicle 1 even after the lapse of the first time.

Thereafter, as illustrated in the lower section of FIG. 2, after the lapse of the second time from the current time, that is, after a lapse of a time required for the lane change, the ECU 10 predicts dangerous areas 40a3, 40b3 of the peripheral vehicles 3a, 3b. In this case, the ECU 10 predicts, the relative speed, the relative distance (the inter-vehicular distance), and the like between the host vehicle 1 and each of the peripheral vehicles 3a, 3b after the second time, and based on these relative speed, relative distance, and the like, sets the dangerous areas 40a3, 40b3 by a similar method to that described above. Next, the ECU 10 sets a target space SP1c between the set dangerous area 40a3 and the set dangerous area 40b3, and also sets a target point P1c at a center of this target space SP1c. Then, the ECU 10 calculates the speed of the host vehicle 1, at which the host vehicle 1 follows the target point P1c, on the basis of a relative speed and a relative distance between the host vehicle 1 and the target point P1c. Based on the relative speed between the speed of this host vehicle 1 and the speed of the peripheral vehicle 3a as the preceding vehicle, and the like, the ECU 10 determines a possibility of a collision of the host vehicle 1 with the peripheral vehicle 3a at the time when the host vehicle 1 changes the lane. In the example illustrated in FIG. 2, the ECU 10 determines that there is no possibility of the collision.

Next, the ECU 10 further determines whether the relative distance between the host vehicle 1 and the target point P1c is shorter than a specified distance (for example, 5 m) and the relative speed between the host vehicle 1 and the target point P1c is lower than a specified speed (for example, 5 to 10 km). In the example illustrated in FIG. 2, the ECU 10 determines that the relative distance is shorter than the specified distance and that the relative speed is lower than the specified speed. Then, the ECU 10 decides to adopt the target point P1c as the travel mediating point, and sets a route L1 that connects the current position of the host vehicle 1 and the travel mediating point P1c (for example, the route L1 may be generated by using a specified curve (a polynomial function or the like)) as the target travel route for the lane change. Driving control is executed by using such a target travel route L1. In such a case, when the relative speed between the speed of the host vehicle 1 and a moving speed of the target point P1c (primarily, a moving speed of the target space SP1c) is lower than the specified speed after the lapse of the second time from the current time, the host vehicle 1 starts changing the lane. Furthermore, the ECU 10 sets the speed, which should be applied to the host vehicle 1, on the above target travel route L1. In the example illustrated in FIG. 2, the ECU 10 sets such a speed that decelerates the host vehicle 1 (see an arrow A1) for the lane change.

The example in which both of the peripheral vehicle 3a as the preceding vehicle and the peripheral vehicle 3b as the following vehicle exist near the host vehicle 1 has been described above. However, in the case where one of such a preceding vehicle and such a following vehicle does not exist, the target space may be set at a position with a sufficient margin being provided from the existing peripheral vehicle (the same applies to an example illustrated in FIG. 3). For example, in the case where only the preceding vehicle exists, a space from a rear end of the preceding vehicle to a position away therefrom by a specified distance may be set as the target space. In the case where only the following vehicle exists, a space from a front end of the following vehicle to a position away therefrom by the specified distance may be set as the target space.

Figure 3:
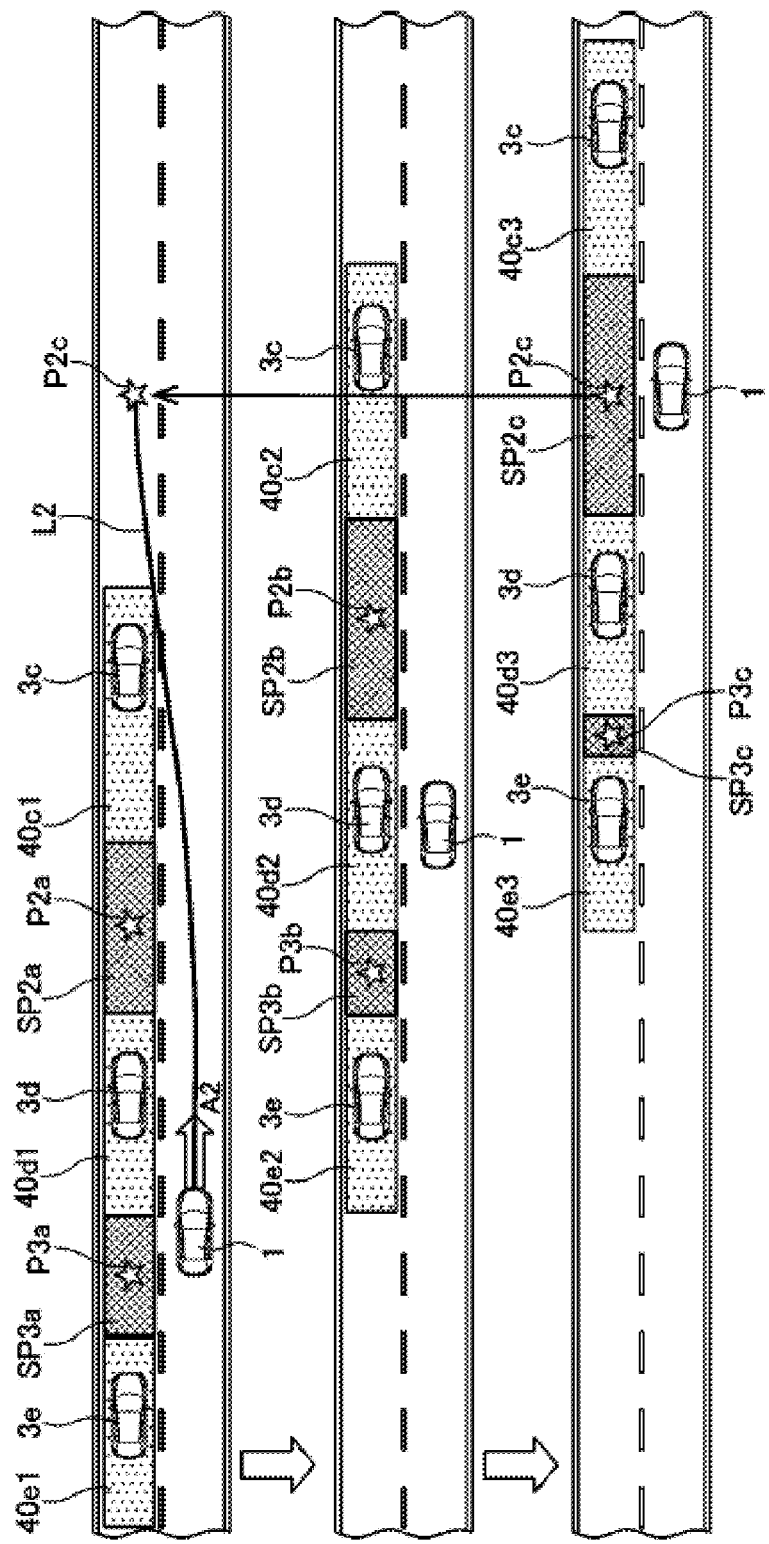
FIG. 3 is an explanatory view of a method for generating the target travel route on which the host vehicle travels during the lane change in the case where the point at which the host vehicle should change the lane is located relatively close to the host vehicle in the embodiment of the present disclosure.

Next, FIG. 3 is an explanatory view of a method for generating the target travel route on which the host vehicle 1 travels during the lane change in the case where the point at which the host vehicle 1 should change the lane is located relatively close to the host vehicle 1 (in the case where the distance between the host vehicle 1 and the point at which the vehicle 1 should change the lane is shorter than the specified distance (1 km in one example), for example, in the case where the merging point or the branched point at which the lane change is necessary is located relatively close to the host vehicle 1. In FIG. 3, the current situation around the host vehicle 1 is illustrated in an upper section, a situation around the host vehicle 1 that is predicted after the lapse of the first time (for example, three seconds) from the current time is illustrated in a middle section, and a situation around the host vehicle 1 that is predicted after the lapse of the second time (for example, six seconds) from the current time is illustrated in a lower section. Similar to the above, in the period from the current time to the lapse of the second time (usually set on the basis of the time required for the vehicle to change the lane), the ECU 10 repeatedly predicts the situation around the host vehicle 1 in the specified cycles. Hereinafter, a description on the same contents as those in FIG. 2 will appropriately be omitted.

First, in the case where the host vehicle 1 changes the lane, the ECU 10 acquires information on peripheral vehicles 3c, 3d, 3e, which exist near the host vehicle 1 on the adjacent lane as the change destination, from the above obstacle information. In this case, the ECU 10 basically acquires the information on the three peripheral vehicles 3c, 3d, 3e that are located the closest to the host vehicle 1 on the adjacent lane as the change destination. In detail, the ECU 10 uses the peripheral vehicle 3d, which is the preceding vehicle located the closest to the host vehicle 1 on the adjacent lane, the peripheral vehicle 3c, which is the preceding vehicle of this peripheral vehicle 3d, and the peripheral vehicle 3e, which is the following vehicle located the closest to the host vehicle 1 on the adjacent lane. In this embodiment, in the case where the point at which the host vehicle 1 should change the lane is located relatively close to the host vehicle 1, there is the tendency that the distance between the peripheral vehicles on the adjacent lane is short (in other words, there is a tendency that the peripheral vehicles on the adjacent lane are relatively dense). In addition, both of the time and the distance for the lane change are insufficient. Thus, the ECU 10 considers two spaces as candidates for a space between the peripheral vehicles, to which the host vehicle 1 moves for the lane change, when setting the target travel route for the lane change, that is, the ECU 10 considers the three peripheral vehicles 3c, 3d, 3e that provide the two spaces. That is, the ECU 10 uses the two spaces as the candidates and compares these spaces so as to finally select the single space for the setting of the target travel route.

Next, based on acquired information on the peripheral vehicles 3c, 3d, 3e, more specifically, based on a relative speed, a relative distance (an inter-vehicular distance), and the like between the host vehicle 1 and each of the peripheral vehicles 3c, 3d, 3e, the ECU 10 sets dangerous areas 40c1, 40d1, 40e1 around the peripheral vehicles 3c, 3d, 3e, respectively. In this case, the ECU 10 sets portions behind the peripheral vehicles 3c, 3d, 3e in the dangerous areas 40c1, 40d1, 40e1 to be longer than portions in front of the peripheral vehicles 3c, 3d, 3e therein. Next, the ECU 10 sets a target space SP2a between the dangerous area 40c1 and the dangerous area 40d1, and also sets a target point P2a at a center of this target space SP2a. In addition, the ECU 10 sets a target space SP3a between the dangerous area 40d1 and the dangerous area 40e1, and also sets a target point P3a at a center of this target space SP3a.

Thereafter, in the period from the current time to the lapse of the second time, the ECU 10 repeatedly predicts the situation around the host vehicle 1 in the specified cycles. As illustrated in the middle section of FIG. 3, in the middle of the period from the current time to the lapse of the second time, more specifically, after the lapse of the first time from the current time, the ECU 10 predicts dangerous areas 40c2, 40d2, 40e2 of the peripheral vehicles 3c, 3d, 3e. Next, the ECU 10 sets a first target space SP2b between the dangerous area 40c2 and the dangerous area 40d2, and also sets a first target point P2b at a center of this first target space SP2b. In addition, the ECU 10 sets a second target space SP3b between the dangerous area 40d2 and the dangerous area 40e2, and also sets a second target point P3b at a center of this second target space SP3b.

Thereafter, as illustrated in the lower section of FIG. 3, after the lapse of the second time from the current time, that is, after the lapse of the time required for the lane change, the ECU 10 predicts dangerous areas 40c3, 40d3, 40e3 of the peripheral vehicles 3c, 3d, 3e. Next, the ECU 10 sets a first target space SP2c between the dangerous area 40c3 and the dangerous area 40d3, and also sets a first target point P2c at a center of this first target space SP2c. In addition, the ECU 10 sets a second target space SP3c between the dangerous area 40d3 and the dangerous area 40e3, and also sets a second target point P3c at a center of this second target space SP3c.

Next, based on changes in size (meaning a length along the stretching direction of the travel road, and the same applies below) of the first and second target spaces SP2c, SP3c after the second time with respect to the first and second target spaces SP2a, SP2b, SP3a, SP3b so far, the ECU 10 selects one of the first and second target spaces SP2c, SP3c as the target space that is used when setting the target travel route for the lane change. That is, the ECU 10 selects one of the first and second target spaces SP2c, SP3c that is appropriate as a space, to which the host vehicle 1 should move by the lane change, on the adjacent lane. In the example illustrated in FIG. 3, the first target space SP2c is increased while the second target space SP3c is reduced. Thus, the ECU 10 selects the first target space SP2c. This is because it is considered that the host vehicle 1 can move more safely to the increased first target space SP2c than to the reduced second target space SP3c on the adjacent lane by the lane change.

Next, the ECU 10 uses the first target space SP2c and the first target point P2c, which are selected as described above, to calculates the speed of the host vehicle 1, at which the host vehicle 1 follows the first target point P2c, on the basis of a relative speed and a relative distance between the host vehicle 1 to the first target point P2c. Based on the relative speed between the speed of this host vehicle 1 and the speed of the peripheral vehicle 3c, which serves as the preceding vehicle when the host vehicle 1 changes the lane to the first target space SP2c, and the like, the ECU 10 determines a possibility of a collision of the host vehicle 1 with the peripheral vehicle 3c at the time when the host vehicle 1 changes the lane. In the example illustrated in FIG. 3, the ECU 10 determines that there is no possibility of the collision.

Next, the ECU 10 further determines whether the relative distance between the host vehicle 1 and the first target point P2c is shorter than the specified distance (for example, 5 m) and the relative speed between the host vehicle 1 and the first target point P2c is lower than the specified speed (for example, 5 to 10 km). In the example illustrated in FIG. 3, the ECU 10 determines that the relative distance is shorter than the specified distance and that the relative speed is lower than the specified speed. Then, the ECU 10 decides to adopt the first target point P2c as the travel mediating point, and sets a route L2 that connects the current position of the host vehicle 1 and the travel mediating point P2c (for example, the route L2 may be generated by using the specified curve (the polynomial function or the like)) as the target travel route for the lane change. The driving control is executed by using such a target travel route L2. In this case, when the relative speed between the speed of the host vehicle 1 and a moving speed of the first target point P2c (primarily, a moving speed of the first target space SP2c) is lower than the specified speed after the lapse of the second time from the current time, the host vehicle 1 starts changing the lane. Furthermore, the ECU 10 sets the speed, which should be applied to the host vehicle 1, on the above target travel route L2. In the example illustrated in FIG. 3, the ECU 10 sets such a speed that accelerates the host vehicle 1 (see an arrow A2) for the lane change.

Figure 4:
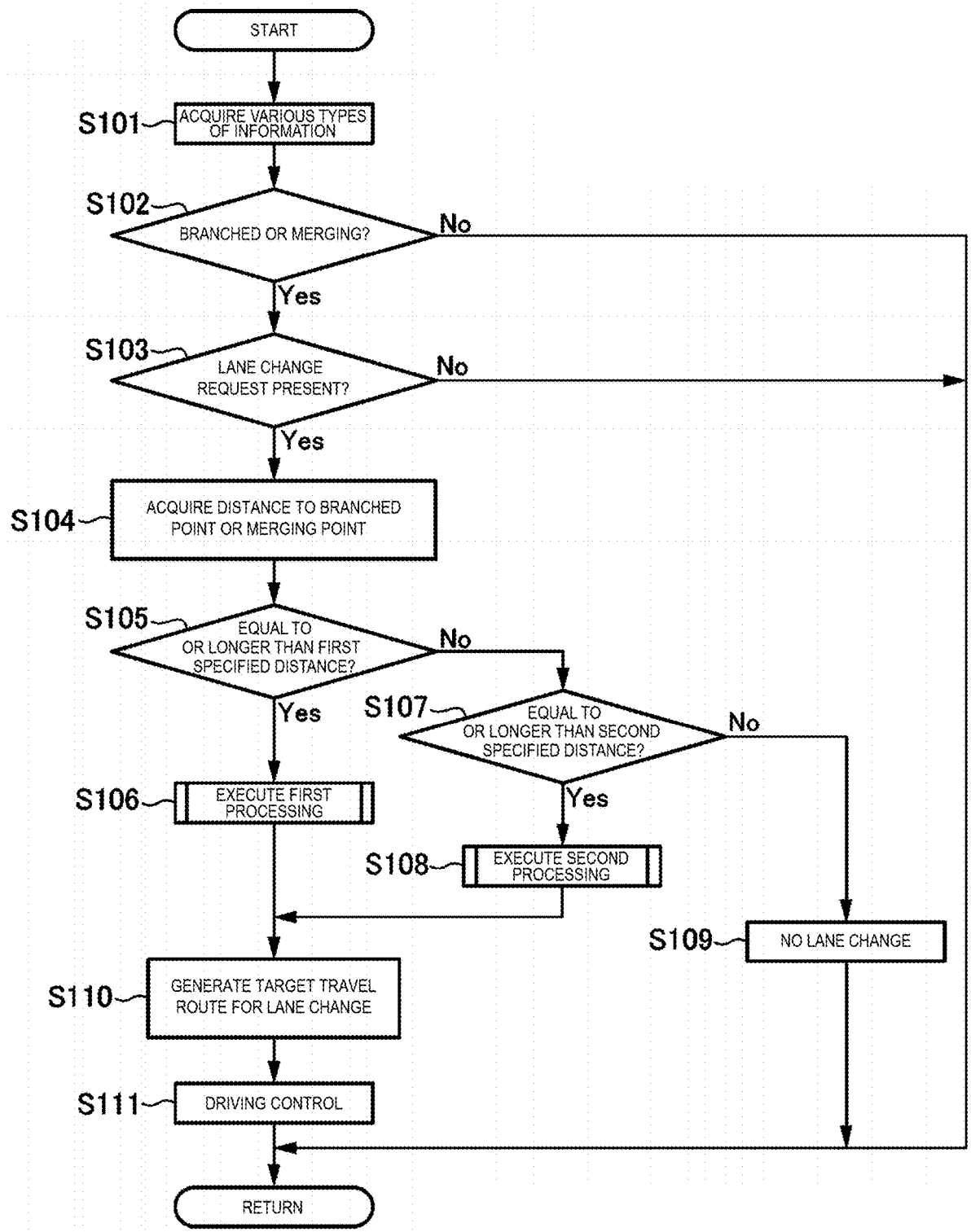
FIG. 4 is a flowchart illustrating overall processing according to the embodiment of the present disclosure.
Figure 5:
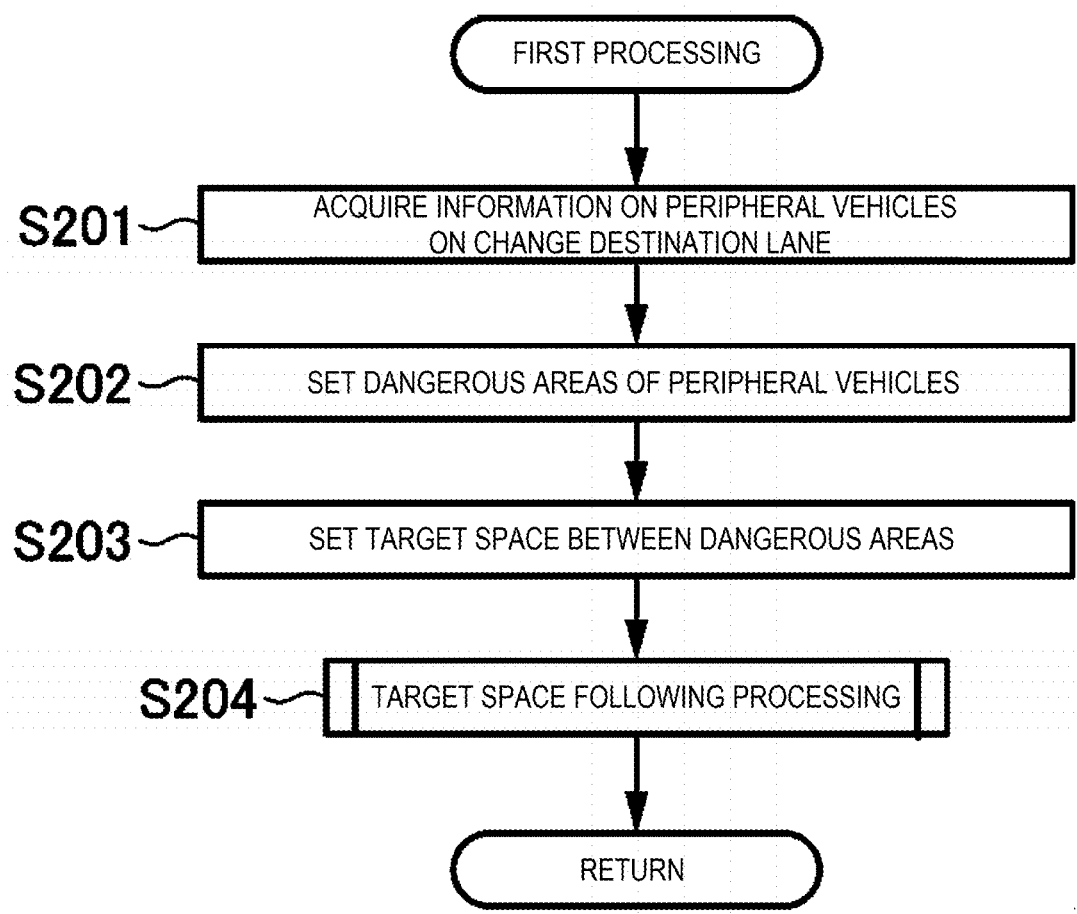
FIG. 5 is a flowchart illustrating first processing according to the embodiment of the present disclosure.
Figure 6:
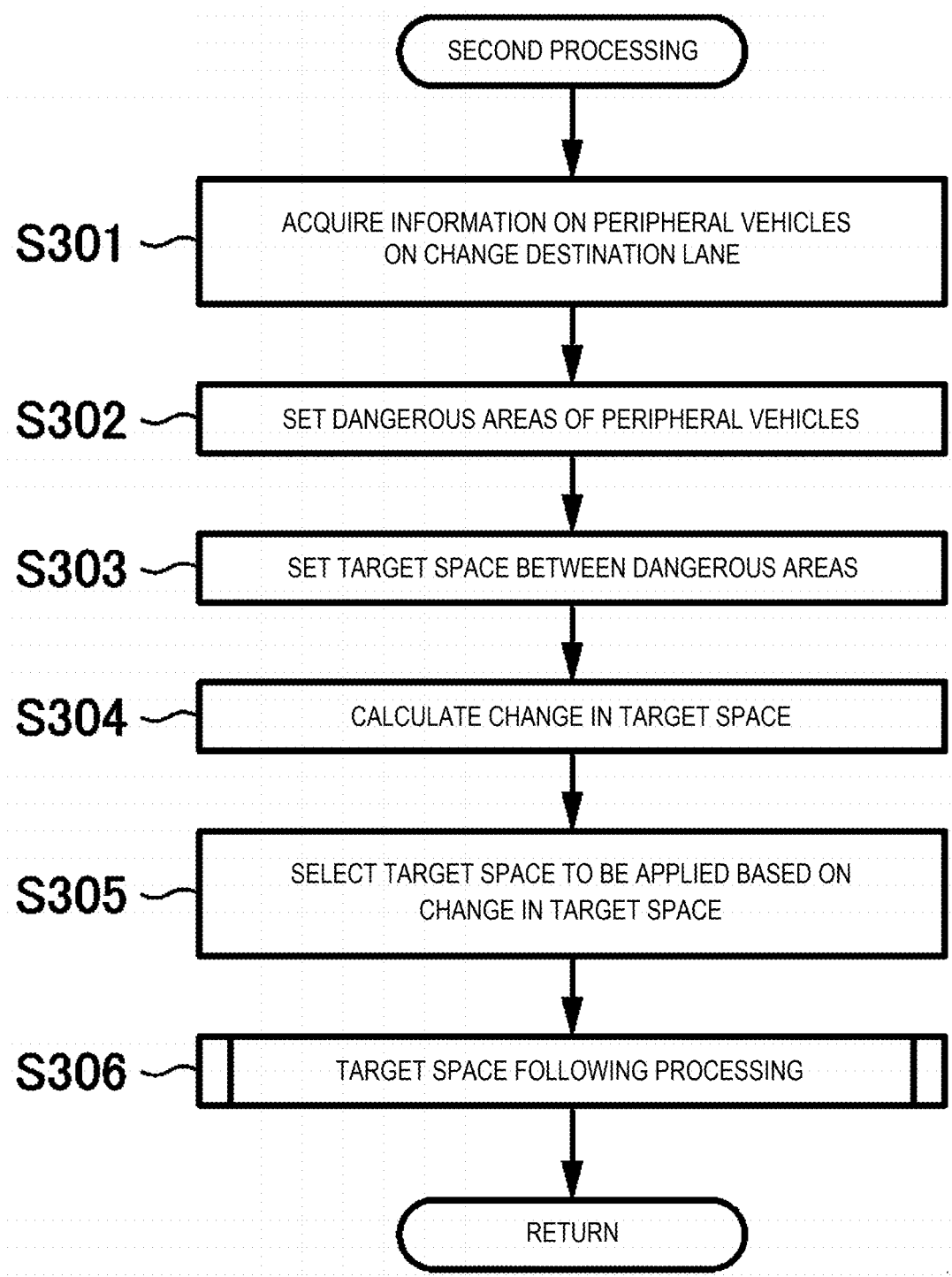
FIG. 6 is a flowchart illustrating second processing according to the embodiment of the present disclosure.
Figure 7:
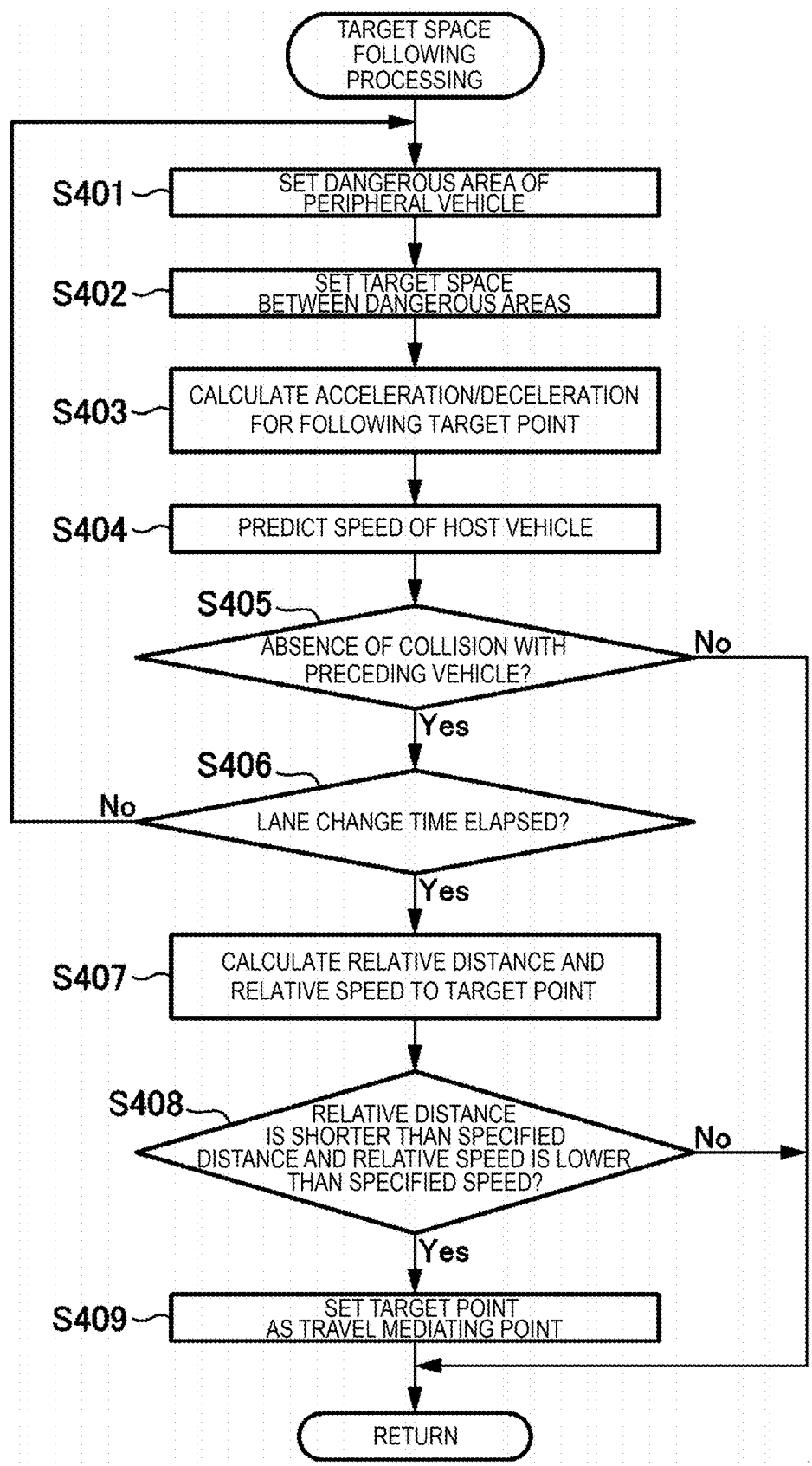
FIG. 7 is a flowchart illustrating target space following processing according to the embodiment of the present disclosure.

Next, a description will be made on a flow of processing that is executed by the ECU 10 in the embodiment of the present disclosure with reference to FIG. 4 to FIG. 7. FIG. 4 is a flowchart illustrating the overall processing according to the embodiment of the present disclosure. FIG. 5 is a flowchart illustrating processing (first processing) to generate the target travel route by the method as illustrated in FIG. 2 in the case where the point at which the host vehicle 1 should change the lane is located relatively far away in the embodiment of the present disclosure. FIG. 6 is a flowchart illustrating processing (second processing) to generate the target travel route by the method as illustrated in FIG. 3 in the case where the point at which the host vehicle 1 should change the lane is located relatively close to the host vehicle 1 in the embodiment of the present disclosure. FIG. 7 is a flowchart illustrating processing (target space following processing) to follow the target space until the second time (hereinafter appropriately referred to as a "lane change time") that corresponds to the time required for the lane change elapses in the embodiment of the present disclosure.

The processing related to the flowchart in FIG. 4 is repeatedly executed by the ECU 10 in specified cycles (for example, every 0.05 to 0.2 second). When the processing related to this flowchart is initiated, in step S101, the ECU 10 acquires various types of the information from the plural types of the sensors illustrated in FIG. 1 (particularly, the camera 21, the radar 22, the vehicle speed sensor 23, the navigation system 30, and the like). In this case, the ECU 10 at least acquires the travel road information and the obstacle information described above.

Next, in step S102, based on the travel road information and the like, the ECU 10 determines whether the travel road is branched or merged before the host vehicle 1 arrives at a destination. As a result, if the ECU 10 determines that the travel road is branched or merged (step S102: Yes), the processing proceeds to step S103. On the other hand, if the ECU 10 determines that the travel road is neither branched nor merged (step S102: No), the processing that is related to the flowchart illustrated in FIG. 4 is terminated.

Next, in step S103, the ECU 10 determines whether a lane change request of the vehicle 1 is present. For example, based on the travel road information and the like, the ECU 10 determines whether the host vehicle 1 has to change the lane due to branching or merging of the travel road. As a result, if the ECU 10 determines that the lane change request is present (step S103: Yes), the processing proceeds to step S104. On the other hand, if the ECU 10 determines that the lane change request is absent (step S103: No), the processing that is related to the flowchart illustrated in FIG. 4 is terminated.

Next, in step S104, the ECU 10 acquires, from the travel road information, a distance from the current position of the host vehicle 1 to the branched point or the merging point. Then, in step S105, the ECU 10 determines whether the distance to the branched point or the merging point is equal to or longer than a first specified distance. Here, the ECU 10 determines whether the branched point or the merging point is located relatively far away, that is, whether it is currently in a situation where the target travel route should be generated by the method as illustrated in FIG. 2. From such an intent of the determination, the first specified distance that is used for the determination in step S105 is set. Preferably, the first specified distance is set according to a type of the travel road. In one example, the first specified distance is set to approximately 1 km on a controlled-access highway and is set to approximately 500 m on a public road.

As a result of step S105, if the ECU 10 determines that the distance to the branched point or the merging point is equal to or longer than the first specified distance (step S105: Yes), the processing proceeds to step S106. Then, the ECU 10 executes the first processing for generating the target travel route by the method as illustrated in FIG. 2. A detailed description on this processing will be made below. On the other hand, if the ECU 10 determines that the distance to the branched point or the merging point is shorter than the first specified distance (step S105: No), the processing proceeds to step S107.

In step S107, the ECU 10 determines whether the distance to the branched point or the merging point is equal to or longer than a second specified distance (<the first specified distance). Here, the ECU 10 determines whether the distance to the branched point or the merging point is extremely short and thus it is currently in a situation where it is difficult to change the lane. From such an intent of the determination, the second specified distance that is used for the determination in step S107 is set. Preferably, the second specified distance is set according to the type of the travel road. In one example, the second specified distance is set to approximately 100 m on the controlled-access highway and is set to approximately 50 m on the public road.

As a result of step S107, if the ECU 10 determines that the distance to the branched point or the merging point is equal to or longer than the second specified distance (step S107: Yes), the processing proceeds to step S108. Then, the ECU 10 executes the second processing for generating the target travel route by the method as illustrated in FIG. 3. A detailed description on this processing will be made below. On the other hand, if the ECU 10 determines that the distance to the branched point or the merging point is shorter than the second specified distance (step S107: No), the processing proceeds to step S109. In this case, the ECU 10 decides to cause the host vehicle 1 not to change the lane in the driving assistance based on the target travel route (step S109), and the processing that is related to the flowchart illustrated in FIG. 4 is terminated.

Next, after steps S106, S108 described above, that is, after the first processing or the second processing is terminated, the processing proceeds to step S110, and the ECU 10 generates the target travel route for the lane change on the basis of the travel mediating point determined by the first processing or the second processing. For example, the ECU 10 generates the target travel route through which the host vehicle 1 arrives at the travel mediating point by the lane change by using a specified curve such as the polynomial function. Then, the processing proceeds to step S111. The ECU 10 sends the control signal to at least one of the engine control system 3l, the brake control system 32, and the steering control system 33 such that the vehicle 1 travels along the generated target travel route, and executes at least one of engine control, braking control, and steering control as the driving control. In this case where the travel mediating point is not decided by the first processing or the second processing (a detail thereon will be described below), the ECU 10 decides to cause the host vehicle 1 not to change the lane in the driving assistance based on the target travel route, and terminates the processing that is related to the flowchart illustrated in FIG. 4.

Next, a description will be made on the first processing that is executed in step S106 of FIG. 4 with reference to FIG. 5. When the first processing is initiated, in step S201, the ECU 10 acquires, from the obstacle information acquired in above step S101, information on the two peripheral vehicles, which exist near the host vehicle 1, on the adjacent lane as the change destination of the host vehicle 1. More specifically, the ECU 10 acquires information on the peripheral vehicle (the preceding vehicle) that is located ahead of the host vehicle 1 and is located the closest to the host vehicle 1 and information on the peripheral vehicle (the following vehicle) that is located behind the host vehicle 1 and is located the closest to the host vehicle 1.

Next, in step S202, the ECU 10 sets the dangerous area around each of these two peripheral vehicles on the basis of the information on the two peripheral vehicles acquired in step S201. More specifically, based on the relative speed and the relative distance (the inter-vehicular distance) between the host vehicle 1 and the preceding vehicle, the ECU 10 calculates the THW and/or the TTC between the host vehicle 1 and the preceding vehicle, and sets the dangerous area around the preceding vehicle from this THW and/or the TTC. In addition, based on the relative speed and the relative distance (the inter-vehicular distance) between the host vehicle 1 and the following vehicle, the ECU 10 calculates the THW and/or the TTC between the host vehicle 1 and the following vehicle, and sets the dangerous area around the following vehicle from this THW and/or TTC. Furthermore, the ECU 10 sets the portions which is stretched behind the preceding vehicle and the following vehicle in the dangerous areas to be longer than the portions in front of the preceding vehicle and the following vehicle therein.

Next, in step S203, the ECU 10 sets the target space between the dangerous area of the preceding vehicle and the dangerous area of the following vehicle set in step S202, and also sets the target point at the center of this target space. Then, in step S204, the ECU 10 executes the target space following processing in FIG. 7 on the basis of the thus-set target space and the like.

Next, a description will be made on the second processing that is executed in step S108 of FIG. 4 with reference to FIG. 6. When the second processing is initiated, in step S301, the ECU 10 acquires, from the obstacle information acquired in above step S101, information on the three peripheral vehicles, which exist near the host vehicle 1, on the adjacent lane as the change destination of the host vehicle 1. More specifically, the ECU 10 acquires information on the peripheral vehicle (hereinafter appropriately referred to as a "second preceding vehicle") that is located ahead of the host vehicle 1 and is located the closest to the host vehicle 1, information on the peripheral vehicle (hereinafter appropriately referred to as a "first preceding vehicle") that is located immediately ahead of this second preceding vehicle, and information on the peripheral vehicle (the following vehicle) that is located behind the host vehicle 1 and is located the closest to the host vehicle 1. These first preceding vehicle, second preceding vehicle, and following vehicle correspond to the "first peripheral vehicle", the "second peripheral vehicle", and the "third peripheral vehicle" in the present disclosure, respectively.

Next, in step S302, the ECU 10 sets the dangerous area around each of these three peripheral vehicles on the basis of the information on the three peripheral vehicles acquired in step S301. More specifically, based on the relative speed and the relative distance (the inter-vehicular distance) between the host vehicle 1 and the first preceding vehicle, the ECU 10 calculates the THW and/or the TTC between the host vehicle 1 and the first preceding vehicle, and sets the dangerous area around the first preceding vehicle from this THW and/or the TTC. By a similar method thereto, the ECU 10 also sets the dangerous area of each of the second preceding vehicle and the following vehicle. Furthermore, the ECU 10 sets the portions which is stretched behind the first preceding vehicle, the second preceding vehicle, and the following vehicle in the dangerous areas to be longer than the portions in front of the first preceding vehicle, the second preceding vehicle, and the following vehicle therein.

Next, in step S303, the ECU 10 sets the target spaces on the basis of the dangerous areas set in step S302. More specifically, the ECU 10 sets a target space (a first target space) between the dangerous area of the first preceding vehicle and the dangerous area of the second preceding vehicle, and also sets a target space (a second target space) between the dangerous area of the second preceding vehicle and the dangerous area of the following vehicle.

Next, in step S304, the ECU 10 calculates changes in the first and second target spaces set in step S303. More specifically, the ECU 10 calculates a change rate (a change speed) of size of each of the first and second target spaces after the lane change time. In this case, based on the relative speed between the host vehicle 1 and the first preceding vehicle, and the like, the ECU 10 calculates a speed at a front end of the first target space after the lane change time. In addition, based on the relative speed between the host vehicle 1 and the second preceding vehicle, and the like, the ECU 10 calculates a speed at a rear end of the first target speed after the lane change time. Then, the ECU 10 acquires the change rate of the size of the first target space from these speeds at the front end and the rear end of the first target space. Similarly, based on the relative speed between the host vehicle 1 and the second preceding vehicle, and the like, the ECU 10 calculates a speed at a front end of the second target space after the lane change time. In addition, based on the relative speed between the host vehicle 1 and the following vehicle, and the like, the ECU 10 calculates a speed at a rear end of the second target space after the lane change time. Then, the ECU 10 acquires the change rate of the size of the second target space from these speeds at the front end and the rear end of the second target space. In addition to such a change rate of the size of each of the first and second target spaces, the ECU 10 calculates the size itself of each of the first and second target spaces after the lane change time.

Next, in step S305, based on the changes in the first and second target spaces calculated in step S304, the ECU 10 selects one of the first and second target spaces that is appropriate as a space, to which the host vehicle 1 should move by the lane change, on the adjacent lane. In one example, in the case where one of the first and second target spaces is increased while the other is reduced, the ECU 10 selects the target space that is increased. In another example, in the case where both of the first and second target spaces are increased, the ECU 10 selects the target space with a higher increase rate or the target space in larger size (that is, the target space, a length of which along the stretching direction of the travel road is longer). In further another example, in the case where both of the first and second target spaces are not increased, that is, in the case where both of the first and second target spaces are reduced or are in constant size, the ECU 10 selects the target space with the lower change rate. In yet another example, in the case where both of the first and second target spaces are reduced and only when the size of one or both of the first and second target spaces is equal to or larger than a specified value, the ECU 10 selects the larger target space of the first and second target spaces. In this example, in the case where the size of both of the first and second target spaces is smaller than the specified value, the ECU 10 neither selects the first nor second target space. In further another example, in the case the changes in the size of the first and second target spaces are substantially the same, and/or in the case where the size of the first and second target spaces is the same, the ECU 10 selects the second target space that is located behind. This is because it is considered to be safer when the host vehicle 1 is decelerated during the lane change and moves to the second target space at the rear than when the host vehicle 1 is accelerated during the lane change and moves to the first target space in front. The plural examples described above may appropriately be combined and implemented.

Then, in step S306, the ECU 10 executes the target space following processing in FIG. 7 on the basis of the target space, which is selected in step S305, and the like.

Next, a description will be made on the target space following processing that is executed in step S204 of FIG. 5 and step S306 of FIG. 6 with reference to FIG. 7. When the target space following processing is initiated, in step S401, the ECU 10 sets the dangerous area for each of the two peripheral vehicles, each of which defines the target space (in the case of the second processing, the target space selected in such processing) applied in the first or second processing described above. More specifically, the ECU 10 predicts the positions and the speeds of the peripheral vehicles and calculates the relative speed and the relative distance (the inter-vehicular distance) between the host vehicle 1 and each of the peripheral vehicles by using the Kalman filter or the like. Then, the ECU 10 sets the dangerous area around each of the peripheral vehicles on the basis of the THW and/or the TTC according to the relative speed and the relative distance between the host vehicle 1 and each of the peripheral vehicles.

Next, in step S402, the ECU 10 sets the target space between the dangerous areas that are set around the two peripheral vehicles in step S401. In addition, the ECU 10 sets the target point at the center of this target space.

Next, in step S403, the ECU 10 calculates acceleration/deceleration for the host vehicle 1 to follow the target point that is set in step S402. More specifically, based on the relative speed and the relative distance between the host vehicle 1 and the target point, the ECU 10 calculates the acceleration/deceleration for the host vehicle 1 to follow the target point. Then, in step S404, the ECU 10 calculates the speed of the host vehicle 1, to which the calculated acceleration/deceleration is applied, that is, the speed of the host vehicle 1 for following the target point.

Next, in step S405, based on the speed of the host vehicle 1 that is calculated in step S404, the ECU 10 determines whether there is a possibility that the host vehicle 1 collides with the preceding vehicle defining the target space when the host vehicle 1 changes the lane. The ECU 10 calculates the TTC from the relative speed and the relative distance between the host vehicle 1 and the preceding vehicle. Then, if this TTC is shorter than a specified time, the ECU 10 determines that there is the possibility that the host vehicle 1 collides with the preceding vehicle (step S405: No). In this case, the ECU 10 terminates the processing that is related to the flowchart illustrated in FIG. 7 without setting the travel mediating point that defines the target travel route for the lane change, in other words, without setting the target point as the travel mediating point. On the other hand, if the TTC is equal to or longer than the specified time, the ECU 10 determines that there is no possibility of the collision between the host vehicle 1 and the preceding vehicle (step S405: Yes), and the processing proceeds to step S406.

In step S406, the ECU 10 determines whether the lane change time has elapsed from the initiation of the target space following processing. If the ECU 10 determines that the lane change time has elapsed (Step 406: Yes), the processing proceeds to step S407. On the other hand, if the ECU 10 determines that the lane change time has not elapsed (Step 406: No), the processing returns to step S401. In this case, the ECU 10 repeats the processing in steps S401 to S406 until the lane change time elapses.

Next, in step S407, the ECU 10 calculates a relative distance and a relative speed between the host vehicle 1 and the target point. Then, in step S408, the ECU 10 determines whether the relative distance between the host vehicle 1 and the target point is shorter than the specified distance (for example, 5 m) and the relative speed between the host vehicle 1 and the target point is lower than the specified speed (for example, 5 to 10 km). Here, the ECU 10 determines whether a relative relationship between the host vehicle 1 and the target space is in a state where the host vehicle 1 can safely and reliably move to the target space.

As a result of step S408, if the relative distance of the host vehicle 1 to the target point is shorter than the specified distance and the relative speed of the host vehicle 1 to the target point is lower than the specified speed (step S408: Yes), the processing proceeds to step S409. Then, the ECU 10 sets this target point as the travel mediating point that defines the target travel route for the lane change. On the other hand, if the relative distance of the host vehicle 1 to the target point is equal to or longer than the specified distance, or if the relative speed of the host vehicle 1 to the target point is equal to or higher than the specified speed (step S408: No), the ECU 10 terminates the processing that is related to the flowchart illustrated in FIG. 7 without setting the target point as the travel mediating point.

Operation and Effects

Next, a description will be made on an operation and effects according to the embodiment of the present disclosure.

According to this embodiment, in the case where the host vehicle 1 changes the lane, the ECU 10 sets the target space, to which the host vehicle 1 should move, between the peripheral vehicles on the change destination lane, predicts the future position of this target space on the basis of the moving speed of the target space, and generates the target travel route, on which the host vehicle 1 travels during the lane change, on the basis of the predicted future position. In this way, it is possible to accurately recognize the position of the space between the peripheral vehicles that is changed according to the peripheral vehicles, each of which moves at various speeds from time to time. As a result, when the host vehicle 1 changes the lane by the driving assistance based on the target travel route, the host vehicle 1 can safely move to the position between the peripheral vehicles on the change destination lane.

According to this embodiment, the ECU 10 sets the dangerous area around each of the two peripheral vehicles, and sets the target space, to which the host vehicle 1 should move, between these dangerous areas on the change destination lane. In this way, when the host vehicle 1 changes the lane and moves to the target space by the driving assistance based on the target travel route, it is possible to effectively prevent the collision of the host vehicle 1 with the peripheral vehicle.

According to this embodiment, the ECU 10 sets the portion, which is stretched behind the peripheral vehicle, in the dangerous area to be longer than the portion, which is stretched ahead of the peripheral vehicle, in the dangerous area. Thus, it is possible to effectively prevent the collision of the host vehicle 1 with the peripheral vehicle in the case where the peripheral vehicle is decelerated during the lane change of the host vehicle 1.

According to this embodiment, the ECU 10 generates such a target travel route that the host vehicle 1 starts changing the lane when the relative speed between the speed of the host vehicle 1 and the moving speed of the target space (primarily, the moving speed of the target point) becomes lower than the specified speed. In this way, when the host vehicle 1 changes the lane by the driving assistance based on the target travel route, the host vehicle 1 can safely and reliably move to the target space.

Meanwhile, according to this embodiment, in the case where the host vehicle 1 changes the lane, the ECU 10 sets the target space, to which the host vehicle 1 should move, between the peripheral vehicles on the change destination lane, predicts the change in the size of this target space, and generates the target travel route, on which the host vehicle 1 travels during the lane change, on the basis of the change in the size of the predicted target space. In this way, it is possible to accurately recognize the size of the space between the peripheral vehicles that is changed according to the peripheral vehicles, each of which moves at the various speeds from time to time. As a result, when the host vehicle 1 changes the lane by the driving assistance based on the target travel route, the host vehicle 1 can safely move to the position between the peripheral vehicles on the change destination lane.

According to this embodiment, the ECU 10 sets the two target spaces (the first and second target spaces) on the change destination lane, selects one of the target spaces on the basis of the change in the size of each of these two target spaces, and generates the target travel route on the basis of the selected target space. In this way, of the spaces between the two peripheral vehicles existing near the host vehicle 1 on the change destination lane, the space that is adequate for the movement of the host vehicle 1 is accurately adopted, and the target travel route can thereby be generated.

According to this embodiment, in the case where one of the first and second target spaces is increased while the other is not increased, the ECU 10 selects the target space that is increased. In this way, it is possible to accurately adopt the target space, to which the host vehicle 1 moves for the lane change, on the adjacent lane. This is because it is considered that the host vehicle 1 can move more safely to the increased target space than to the reduced target space.

According to this embodiment, in the case where both of the first and second target spaces are not increased, that is, in the case where both of the first and second target spaces are reduced or are in the constant size, the ECU 10 selects the target space with the lower change rate. Also, in this way, it is possible to accurately adopt the target space, to which the host vehicle 1 can further safely move, on the adjacent lane in the lane change. This is because, in this case, it is considered to be safe that the host vehicle 1 moves to the target space with the lower change rate in this case.

According to this embodiment, in the case where both of the first and second target spaces are reduced and the size of one or both of the first and second target spaces is equal to or larger than the specified value, the ECU 10 selects the larger target space of the first and second target spaces. Also, in this way, it is possible to accurately adopt the target space, to which the host vehicle 1 can further safely move, on the adjacent lane in the lane change. This is because, in this case, it is considered that the host vehicle 1 moves safely to this target space when the target space is reduced but is still large enough.

According to this embodiment, in the case where the change in the size of the first and second target spaces is substantially the same, the ECU 10 selects the second target space. Also, in this way, it is possible to accurately adopt the target space, to which the host vehicle 1 can further safely move, on the adjacent lane in the lane change. This is because, in this case, it is considered to be safer when the host vehicle 1 is decelerated during the lane change and moves to the second target space at the rear than when the host vehicle 1 is accelerated during the lane change and moves to the first target space in front.

According to this embodiment, in the case where the distance to the point, at which the host vehicle 1 should change the lane, is equal to or longer than the specified distance, the ECU 10 predicts the future position of the target space on the basis of the moving speed of the target space and generates the target travel route, on which the host vehicle 1 travels during the lane change, on the basis of the predicted future position. On the other hand, in the case where the distance to the point, at which the host vehicle 1 should change the lane, is shorter than the specified distance, the ECU 10 predicts the change in the size of the target space and generates the target travel route, on which the host vehicle 1 travels during the lane change, on the basis of the change in the size of the predicted target space. In this way, it is possible to appropriately switch the processing to generate the target travel route on the basis of the target space according to whether the point, at which the host vehicle 1 should change the lane, is located far away from or near the host vehicle 1.

MODIFIED EXAMPLES

In the embodiment described above, in the first processing, the target travel route is generated on the basis of the single target space that is defined by the two peripheral vehicles (see FIG. 2). In another example, the target travel route may be generated on the basis of the two or more target spaces that are defined by the three or more peripheral vehicles. In addition, in the embodiment described above, in the second processing, the target travel route is generated on the basis of the two target spaces that are defined by the three peripheral vehicles (see FIG. 3). In another example, the target travel route may be generated on the basis of the three or more target spaces that are defined by the four or more peripheral vehicles.

In the embodiment described above, the example in which the present disclosure is applied to the vehicle 1 having the engine as a drive source has been described (see FIG. 1). However, the present disclosure can also be applied to a vehicle having an electric motor as the drive source (an electric vehicle or a hybrid vehicle). In addition, in the above-described embodiment, the braking force is applied to the vehicle 1 by the brake system (the brake control system 32). However, in another example, the braking force may be applied to the vehicle by regeneration of the electric motor.

DESCRIPTION OF REFERENCE SIGNS AND NUMERALS

1 Vehicle (host vehicle)
3*a* to 3*e* Peripheral vehicle
10 ECU
21 Camera
22 Radar
30 Navigation system
31 Engine control system
32 Brake control system
33 Steering control system
100 Vehicle driving assistance system

The invention claimed is:

1. A travel route generation system comprising:
a travel road information acquisition sensor that acquires travel road information on a travel road of a host vehicle;
an obstacle information acquisition sensor that acquires obstacle information on an obstacle on the travel road; and
circuitry configured to generate a target travel route, on which the host vehicle travels, along the travel road based on the travel road information and the obstacle information, wherein
the circuitry is further configured to:
acquire information on at least two peripheral vehicles, which exist near the host vehicle, on a change destination lane, from the obstacle information under a condition it is planned for the host vehicle to change lanes;
set a target space, to which the host vehicle should move, between the at least two peripheral vehicles in the change destination lane based on the information on the at least two peripheral vehicles;
predict a change in size of the target space;
generate the target travel route, on which the host vehicle travels during a lane change operation, based on the predicted change in the size of the target space;
acquire information on a first peripheral vehicle of the at least two peripheral vehicles that exists on the change destination lane, information on a second peripheral vehicle of the at least two peripheral vehicles and that exists behind the first peripheral vehicle, and information on a third peripheral vehicle of the at least two peripheral vehicles that exists behind the second peripheral vehicle as the information on the at least two peripheral vehicles;
set a first target space between the first peripheral vehicle and the second peripheral vehicle and a second target space between the second peripheral vehicle and the third peripheral vehicle as the target spaces based on the information on the first, second, and third peripheral vehicles;
select one of the first target space and second target space based on the change in the size of each of the first target space and the second target space;
generate the target travel route based on the selected target space; and
select a target space that is increased under a condition in which one of the first target space and the second target space is increased while the other is not increased.

2. The travel route generation system according to claim 1, wherein
the circuitry is further configured to select a target space with a lower change rate of size under a condition that both of the first target space and the second target space are not increased.

3. The travel route generation system according to claim 1, wherein
the circuitry is further configured to select a larger target space of the first target space and the second target space under a condition that both of the first target space and the second target space are reduced and the size of one or both of the first target space and the second target space is equal to or larger than a specified value.

4. The travel route generation system according to claim 3, wherein
the circuitry is further configured to select the second target space under a condition that the change in size of the first target space and the second target spaces is substantially the same.

5. The travel route generation system according to claim 4, wherein
the circuitry is further configured to:
set a first dangerous area that the host vehicle does not enter around the first peripheral vehicle and a second dangerous area around the second peripheral vehicle based on the information on said at least two peripheral vehicles;
set the target space between the first dangerous area and the second dangerous area; and
set a first portion that is stretched in the first dangerous area behind the first peripheral vehicle in the first dangerous area to be longer than a second portion stretched ahead of the first peripheral vehicle in the first dangerous area.

6. The travel route generation system according to claim 5, wherein
the circuitry is further configured to generate such a target travel route in response to the lane change operation that occurs for the host vehicle in response to a relative speed between a speed of the host vehicle and a moving speed of the target space being lower than a specified speed.

7. The travel route generation system according to claim 6, wherein
the circuitry is further configured to:
generate the target travel route, on which the host vehicle travels during the lane change operation, based on the predicted change in the size of the target space under a condition that a distance to a point, at which the host vehicle is planned to change lanes, is shorter than a specified distance; and
predict a future position of the target space on the basis of the moving speed of said target space and generate the target travel route, on which the host vehicle travels during the lane change operation, based on the predicted future position under a condition that the distance to the point, at which the host vehicle is planned to change lanes, is equal to or longer than the specified distance.

8. The travel route generation system according to claim 1, further comprising:
a controller configured to execute driving control of the host vehicle such that the host vehicle travels along the target travel route.

9. The travel route generation system according to claim 1, wherein
the circuitry is further configured to:
set a first dangerous area that the host vehicle does not enter around a first peripheral vehicle of the at least two peripheral vehicles and a second dangerous area around a second peripheral vehicle of the at least two peripheral vehicles based on the information on said at least two peripheral vehicles;
set the target space between the first dangerous area and the second dangerous area; and
set a first portion that is stretched in the first dangerous area behind the first peripheral vehicle in the first dangerous area to be longer than a second portion stretched ahead of the first peripheral vehicle in the first dangerous area.

10. The travel route generation system according to claim 1, wherein
the circuitry is further configured to generate such a target travel route in response to the lane change operation that occurs for the host vehicle in response to a relative speed between a speed of the host vehicle and a moving speed of the target space being lower than a specified speed.

11. The travel route generation system according to claim 1, wherein
the circuitry is further configured to:
generate the target travel route, on which the host vehicle travels during the lane change operation, based on the predicted change in the size of the target space under a condition that a distance to a point, at which the host vehicle is planned to change lanes, is shorter than a specified distance; and
predict a future position of the target space on the basis of the moving speed of said target space and generate the target travel route, on which the host vehicle travels during the lane change operation, based on the predicted future position under a condition that the distance to the point, at which the host vehicle is planned to change lanes, is equal to or longer than the specified distance.

12. The travel route generation system according to claim 1, further comprising:
a controller configured to execute driving control of the host vehicle such that the host vehicle travels along the target travel route.

13. A travel route generation system comprising:
a travel road information acquisition sensor that acquires travel road information on a travel road of a host vehicle:
an obstacle information acquisition sensor that acquires obstacle information on an obstacle on the travel road; and
circuitry configured to generate a target travel route, on which the host vehicle travels, along the travel road based on the travel road information and the obstacle information, wherein
the circuitry is further configured to:
acquire information on at least two peripheral vehicles, which exist near the host vehicle, on a change destination lane, from the obstacle information under a condition it is planned for the host vehicle to change lanes;
set a target space, to which the host vehicle should move, between the at least two peripheral vehicles in the change destination lane based on the information on the at least two peripheral vehicles;
predict a change in size of the target space;
generate the target travel route, on which the host vehicle travels during a lane change operation, based on the predicted change in the size of the target space;
acquire information on a first peripheral vehicle of the at least two peripheral vehicles that exists on the change destination lane, information on a second peripheral vehicle of the at least two peripheral vehicles and that exists behind the first peripheral vehicle, and information on a third peripheral vehicle of the at least two peripheral vehicles that exists behind the second peripheral vehicle as the information on the at least two peripheral vehicles;
set a first target space between the first peripheral vehicle and the second peripheral vehicle and a second target space between the second peripheral vehicle and the third peripheral vehicle as the target spaces based on the information on the first, second, and third peripheral vehicles;
select one of the first target space and second target space based on the change in the size of each of the first target space and the second target space;
generate the target travel route based on the selected target space; and
select a target space with a lower change rate of size under a condition that both of the first target space and the second target space are not increased.

14. The travel route generation system according to claim 1, wherein
the circuitry is further configured to select a larger target space of the first target space and the second target space under a condition that both of the first target space and the second target space are reduced and the size of one or both of the first target space and the second target space is equal to or larger than a specified value.

15. The travel route generation system according to claim 1, wherein
the circuitry is further configured to select the second target space under a condition that the change in size of the first target space and the second target spaces is substantially the same.

16. The travel route generation system according to claim 13, wherein
the circuitry is further configured to select a larger target space of the first target space and the second target space under a condition that both of the first target space and the second target space are reduced and the size of one or both of the first target space and the second target space is equal to or larger than a specified value.

17. The travel route generation system according to claim 13, wherein
the circuitry is further configured to select the second target space under a condition that the change in size of the first target space and the second target spaces is substantially the same.

18. The travel route generation system according to claim 14, wherein
the circuitry is further configured to select the second target space under a condition that the change in size of the first target space and the second target spaces is substantially the same.

* * * * *